United States Patent [19]

Wu

[11] Patent Number: 4,959,760
[45] Date of Patent: Sep. 25, 1990

[54] LIGHTING EQUIPMENT FOR AN EYEGLASSES

[76] Inventor: Te Sheng Wu, No. 11, Alley 17, Lane 58, Ma Tsu Miao St., She Tou Hsiang, Chang Hua Hsien, Taiwan

[21] Appl. No.: 467,158

[22] Filed: Jan. 19, 1990

[51] Int. Cl.⁵ .............................................. F21L 15/14
[52] U.S. Cl. ................................... 362/105; 362/269; 362/419
[58] Field of Search ............... 362/103, 105, 269, 270, 362/396, 419

[56] References Cited

U.S. PATENT DOCUMENTS

| | | | |
|---|---|---|---|
| 2,794,908 | 6/1957 | Evans | 362/105 |
| 3,350,552 | 10/1967 | Lawrence | 362/105 |
| 3,683,168 | 8/1972 | Tatje | 362/105 |
| 3,769,663 | 11/1973 | Perl | 362/105 X |
| 4,616,257 | 10/1986 | Kloots et al. | 362/419 X |
| 4,616,297 | 10/1986 | Liu | 362/105 |

*Primary Examiner*—Ira S. Lazarus
*Assistant Examiner*—Peggy A. Neils
*Attorney, Agent, or Firm*—Steinberg & Raskin

[57] ABSTRACT

A lighting equipment for an eyeglasses includes a fin attached to one side of a main frame of the eyeglasses. A clamping frame has a pair of retaining plates formed at one side and a pair of clamping plates formed at an other side. The fin is force-fitted within the retaining plates of the clamping frame. A housing has an open lateral end enclosable by the clamping frame. A bulb is force-fitted and laterally rotatable within the housing. The light beam emitted from the bulb is adjustable both in a vertical direction and in a lateral direction.

9 Claims, 3 Drawing Sheets

LIGHTING EQUIPMENT FOR AN EYEGLASSES

BACKGROUND OF THE INVENTION

The present invention relates to a lighting equipment, and more particularly to a lighting equipment for an eyeglasses.

There are many examinations held in school necessitating many school children to wear eyeglasses. In Taiwan, R.O.C., more than 60% of the school children wear eyeglasses. One of the most important reasons is that the light is insufficient.

The present invention has arisen to provide a lighting equipment for an eyeglasses.

SUMMARY OF THE INVENTION

The primary objective of the present invention is to provide a lighting equipment for an eyeglasses, the lighting equipment is removably attached to one side of the eyeglasses and the direction of the light beam emitted from the lighting equipment is adjustable.

In accordance with one aspect of the invention, there is provided a lighting equipment for an eyeglasses which includes a fin attached to one side of a main frame of the eyeglasses. A clamping frame has a pair of retaining plates formed at one side and a pair of clamping plates formed at an other side. The fin is force-fitted within the retaining plates of the clamping frame. A housing has an open lateral end enclosable by the clamping frame and has open front end. A bulb is force-fitted and laterally rotatable within the housing. The bulb extends beyond the open front end of the housing.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
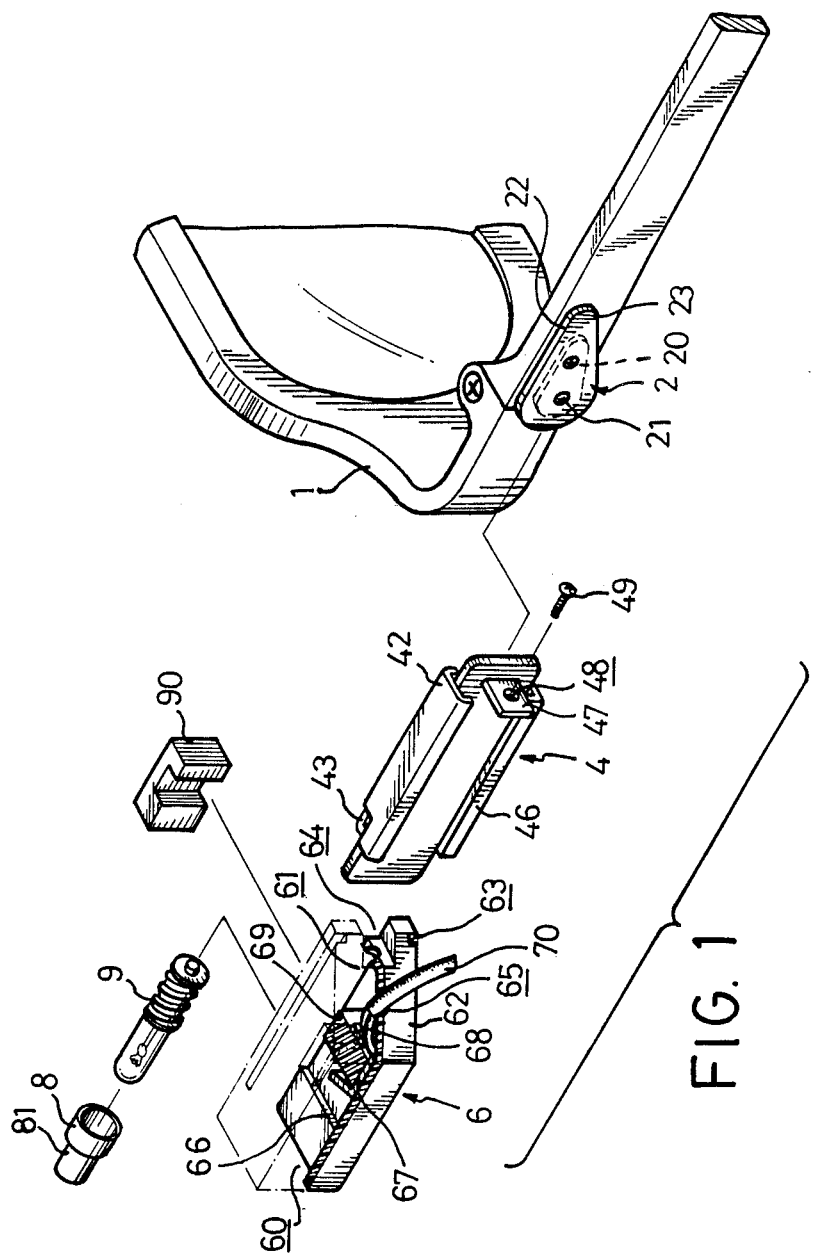
FIG. 1 is an exploded view of a lighting equipment in accordance with the present invention.
Figure 2:
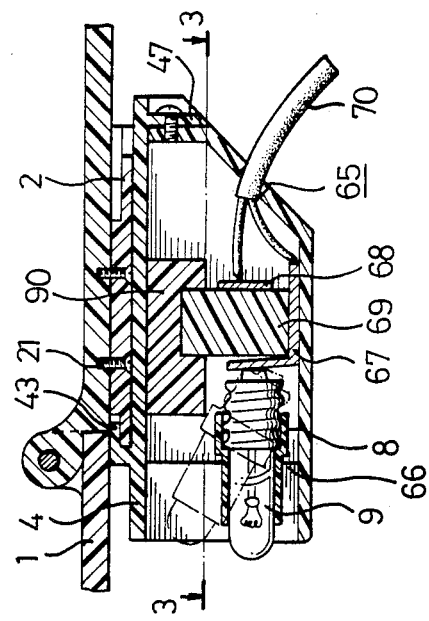
FIG. 2 is a cross-sectional view of the lighting equipment which is in an assembled condition.
Figure 3:
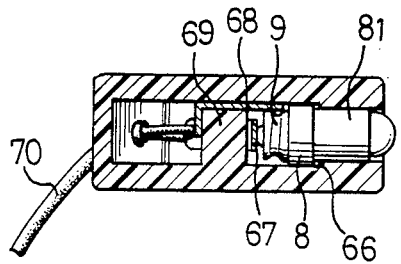
FIG. 3 is a cross sectional view of the lighting equipment taken along the lines 3—3 of FIG. 2.

Referring to the drawings and initially to FIGS. 1, 2 and 3, the lighting equipment for an eyeglasses in accordance with the present invention comprises generally a fin 2 rigidly attached to one side of a main frame 1 of the eyeglasses, a clamping frame 4 engageable with the fin 2, a housing 6 engageable on an outer side of the clamping frame 4, and a bulb 9 being force-fitted within the housing 6.

The fin 2 is substantially airfoil shaped and has a level upper surface 322 and an inclined lower surface 23. A flange 20, which has a shape similar to the fin 2 but has a reduced size is integrally formed on one side of the fin 2. The fin 2 and the flange 20 are fixed to one side of the main frame 1 of the eyeglasses by two screws 20. The flange 20 bears between the main frame 1 of the eyeglasses and the fin 2. The fin 2 and the flange 20 are substantially parallel.

The clamping frame 4 is substantially a plate having a pair of horizontal retaining plates 42 and a vertical retaining plate 43 integrally formed on one side thereof, and having a pair of horizontal clamping plates 46 and a lug 47 integrally formed on the other side thereof. The retaining plates 42, 43 and the clamping plates 46 are substantially L-shaped. A hole 48 is formed in a center portion of the lug 47. The fin 2 is snugly force-fitted among the horizontal retaining plates 42 and the vertical retaining plates 43 so that the clamping frame 4 is rotatable relative to the fin 2. A substantially semicircular front end of the fin 2 bears against an inner surface of the vertical retaining plate 43.

The housing 6 is substantially trapezoid with an open front end 60 and an open lateral end 61. A pair of grooves 63 are formed in both sides of the housing 6 close to the open lateral end 61 for receiving the respective horizontal clamping plates 46 of the clamping frame 4. A recess 64 is formed in a tapered end 62 of the housing 6 for receiving the lug 47 of the clamping frame 4. The housing 6 and the clamping frame 4 are fixed together by a screw 49 or the like. A hole 65 is formed in the tapered end 62 of the housing 6. As is best shown in FIG. 3, a shoulder 66 is respectively formed on an inner upper surface and an inner lower surface of the housing 6 close to the open front end 60 thereof. A resilient conductor 67 and a side contact conductor 68 are retained within the housing 6 by a retaining block 69 and are connected to a power supply by a wire 70 which passes through the hole 65 of the tapered end 62.

A sleeve 8 is substantially cylindrical and has a reduced diameter portion 81 formed thereon so that a bulb 9 is received within the sleeve 8. The front end of the bulb 9 extends beyond the reduced diameter portion 81 of the sleeve 8 and the base of the bulb 9 is force-fitted within the sleeve 8. The front end of the bulb 9 is touchable from the open front end 60 of the housingn 6. As is best shown in FIG. 3, the sleeve 8 is force-fitted within the open front end 60 of the housing 6. The sleeve 8 is preferably made of nonconductive materials. The side contact conductor 68 is electrically connected to a case electrode of the base of the bulb 9. The resilient conductor 67 contacts a center electrode of the base of the bulb 9. After the bulb 9 and the sleeve 8 are force-fitted within the housing 6, a stop 90 which is substantially U-shaped is forced-fitted on an outer end of the retaining block 69 so as to limit a movement of the base of the bulb 9. The sleeve 8 is provided for reducing an abrasion or a wear of the base of the bulb 9.

As shown in FIG. 2, the sleeve 8 with the bulb 9 is rotatable between a position as shown in solid lines and a position as shown in image lines so that the direction of the light beam emitted from the bulb 9 is laterally adjustable. The shoulders 66 limit a forward movement of the sleeve 8. Alternatively, the bulb 9 is directly force-fitted within the housing 6 without the sleeve 8. The case electrode of the base of the bulb directly contacts the side contact conductor 68.

Figure 4:
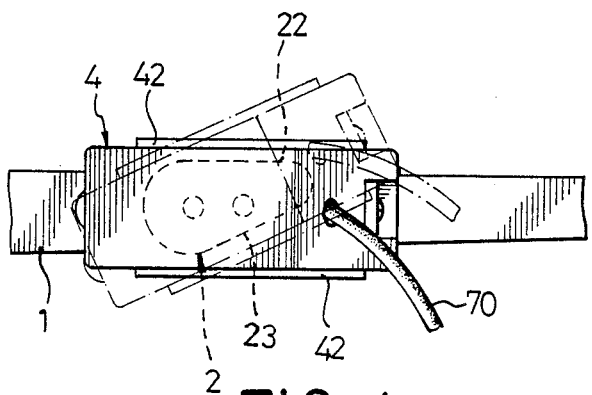
FIG. 4 is a side elevational view of the lighting equipment.

Referring next to FIG. 4, the horizontal retaining plates 42 and the vertical retaining plate 43 of the clamping frame 4 snugly hold the fin 2. The clamping frame 4 is rotatable relative to the fin 2 between a position, as shown in solid lines, where the upper horizontal retaining plate 42 bears against the level upper surface 22 of the fin 2, and a position, as shown in image lines, where the lower horizontal retaining plate 42 bears against the inclined lower surface 23 of the fin 2 so that the light beam emitted from the bulb 9 is vertically adjustable.

Figure 5:
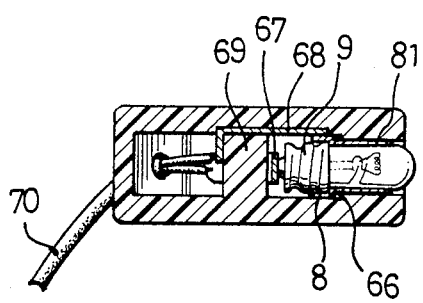
FIG. 5 is a cross sectional view similar to FIG. 3, illustrating another embodiment of the present invention.

Referring next to FIG. 5, illustrating another embodiment of the present invention. The side contact conductor 68 runs longer than that is shown in FIG. 3. The sleeve 8 is made of electrically conductive materials and is conducted between the side contact conductor 68 and the case electrode of the bulb 9 in order to make an electrical connection therebetween.

Accordingly, the present invention has the following advantages:

(a) the light beam emitted from the bulb is adjustable both in a vertical direction and in a lateral direction.

(b) The lighting equipment is removable when it is not in use.

(c) The lighting equipment is relatively fixed on the eyeglasses so that the light beam emitted from the bulb moves relative to a movement of the vision of a user.

Although this invention has been described with a certain degree of particularity, it is to be understood that the present disclosure has been made by way of example only and that numerous changes in the detailed construction and the combination and arrangement of parts may be resorted to without departinig from the spirit and scope of the invention as hereinafter claimed.

I claim:

1. A lighting equipment for an eyeglasses comprising a fin attached to one side of a main frame of said eyeglasses; a clamping frame having a retaining means formed at one side thereof and having a clamping means formed at an other side thereof, said fin being force-fitted within said retaining means of said clamping frame so that said clamping frame is vertically rotatable relative to said fin; a housing having an open lateral end enclosable by said clamping frame and having an open front end; a side contact conductor and a resilient conductor being provided within said housing; and a bulb being force-fitted within said housing, a peripheral surface of a base of said bulb being electrically contacted to said side contact conductor, a center electrode of said base of said bulb being electrically contacted to said resilient conductor, a front end of said bulb being touchable from said open front end of said housing, and said bulb being laterally rotatable within said housing.

2. A lighting equipment according to claim 1, wherein said fin is substantially airfoil shaped and has a level upper surface and an incline lower surface.

3. A lighting equipment according to claim 1, wherein said retaining means comprises a pair of horizontal retaining plates and a vertical retaining plate for receiving said fin therebetween.

4. A lighting equipment according to claim 1, wherein said clamping means is substantially a pair of L-shaped horizontal clamping plates; a pair of grooves are formed on both sides of said housing close to said open lateral end of said housing for receiving said clamping plates of said clamping means.

5. A lighting equipment according to claim 1, wherein a recess is formed in one end of said housing; a lug with a hole is formed on said clamping frame so that said lug is engageable within said recess of said housing.

6. A lighting equipment according to claim 1, wherein a shoulder is formed in said housing close to said open front end so as to limit a forward movement of said bulb.

7. a lighting equipment according to claim 6, wherein a sleeve which is substantially cylindrical is force-fitted within said housing; said bulb is force fitted within said sleeve; said sleeve has an annular shoulder bearing against said shoulder of said housing; and said sleeve is electrically contacted to said side contact conductor.

8. A lighting equipment according to claim 6, wherein a sleeve which is substantially cylindrical is force-fitted within said housing; said bulb is force-fitted within said sleeve; a rear half of said bulb protrudes out of said sleeve; said sleeve has an annular shoulder bearing against said shoulder of said housing; and said rear half of said base of said bulb is electrically contacted to said side contact conductor.

9. A lighting equipment according to claim 1, wherein a stop is force-fitted within said open lateral end of said housing for limiting a lateral movement of said base of said bulb.

* * * * *